(12) United States Patent
Dylewski, II et al.

(10) Patent No.: US 9,981,600 B2
(45) Date of Patent: May 29, 2018

(54) ADJUSTABLE TRUCK COVER LIGHT

(71) Applicant: Truck Accessories Group, LLC, Elkhart, IN (US)

(72) Inventors: Eugene A. Dylewski, II, Granger, IN (US); Ernest M. McDonald, II, Granger, IN (US)

(73) Assignee: Truck Accessories Group, LLC, Elkhart, IN (US)

( * ) Notice: Subject to any disclaimer, the term of this patent is extended or adjusted under 35 U.S.C. 154(b) by 0 days. days.

(21) Appl. No.: 15/381,365

(22) Filed: Dec. 16, 2016

(65) Prior Publication Data

US 2017/0267168 A1 Sep. 21, 2017

Related U.S. Application Data

(60) Provisional application No. 62/270,147, filed on Dec. 21, 2015.

(51) Int. Cl.

| | |
|---|---|
| *B60Q 3/00* | (2017.01) |
| *B60Q 3/30* | (2017.01) |
| *B60Q 3/74* | (2017.01) |
| *B60Q 3/82* | (2017.01) |
| *B60Q 3/51* | (2017.01) |
| *B60J 7/16* | (2006.01) |

(52) U.S. Cl.
CPC .............. *B60Q 3/30* (2017.02); *B60J 7/1607* (2013.01); *B60Q 3/51* (2017.02); *B60Q 3/745* (2017.02); *B60Q 3/82* (2017.02)

(58) Field of Classification Search
CPC . B60Q 3/30; B60Q 3/51; B60Q 3/745; B60Q 3/82; B60J 7/1607
See application file for complete search history.

(56) References Cited

U.S. PATENT DOCUMENTS

| | | |
|---|---|---|
| 2,534,501 A | 12/1950 | Coleman |
| 4,273,377 A | 6/1981 | Alexander |
| 4,547,014 A | 10/1985 | Wicker |
| 4,639,034 A | 1/1987 | Amos |
| 4,946,217 A | 8/1990 | Steffens et al. |
| 5,524,953 A | 6/1996 | Shaer |
| 5,636,893 A | 6/1997 | Wheatley et al. |
| 5,643,491 A | 7/1997 | Honkura et al. |
| 6,116,761 A * | 9/2000 | Munsey .................. B60Q 3/30 362/296.01 |
| 6,170,900 B1 | 1/2001 | Kooiker |
| 6,203,086 B1 | 3/2001 | Dirks et al. |

(Continued)

*Primary Examiner* — Thomas M Sember

(74) *Attorney, Agent, or Firm* — Barnes & Thornburg LLP

(57) ABSTRACT

A pickup truck is provided that includes a tonneau cover or bed cap that includes a lighting system. The light system is selectively attached to the tonneau cover or bed cap. The light system includes a longitudinally extending rod having an illuminating portion extending along at least a portion of the longitudinal extent of the rod. The longitudinally extending rod includes first and second end portions and an on/off switch located at least adjacent to the first end portion of the longitudinally extending rod. At least one clip is attached to the tonneau cover or bed cap that selectively holds the longitudinally extending rod. The longitudinally extending rod is pivotable within the at least one clip such that the illuminating portion is selectively directable toward different directions.

20 Claims, 8 Drawing Sheets

(56) References Cited

U.S. PATENT DOCUMENTS

| | | | |
|---|---|---|---|
| 6,406,169 B1 * | 6/2002 | Munsey | B60Q 3/30 362/485 |
| 6,422,635 B1 | 7/2002 | Steffens et al. | |
| 6,565,141 B1 | 5/2003 | Steffens et al. | |
| D494,763 S | 8/2004 | Fenton et al. | |
| 6,783,267 B1 * | 8/2004 | Yeoman | B60Q 3/74 362/394 |
| 6,832,803 B2 * | 12/2004 | Elliott | B60J 7/104 296/100.01 |
| 7,147,265 B1 | 12/2006 | Schmeichel | |
| D538,043 S | 3/2007 | Fenton et al. | |
| 7,334,830 B2 | 2/2008 | Weldy | |
| 7,484,788 B2 | 2/2009 | Calder et al. | |
| 8,348,328 B2 | 1/2013 | Walser et al. | |
| 8,480,154 B2 | 7/2013 | Yue | |
| 8,544,708 B2 | 10/2013 | Maimin | |
| 8,585,120 B2 | 11/2013 | Rusher et al. | |
| 8,632,114 B2 | 1/2014 | Yue | |
| 8,641,124 B1 | 2/2014 | Yue | |
| 8,672,388 B2 | 3/2014 | Rusher et al. | |
| 8,678,469 B2 | 3/2014 | Hang et al. | |
| 8,690,224 B2 | 4/2014 | Maimin et al. | |
| 8,960,765 B2 | 2/2015 | Facchinello et al. | |
| 9,004,571 B1 | 4/2015 | Bernardo et al. | |
| 9,033,393 B2 | 5/2015 | Damsi et al. | |
| 2006/0102669 A1 | 5/2006 | Fouts et al. | |
| 2011/0049316 A1 | 3/2011 | Vitoorapakorn et al. | |
| 2013/0229027 A1 | 9/2013 | Copp et al. | |
| 2014/0042754 A1 | 2/2014 | Spencer | |
| 2015/0123421 A1 | 5/2015 | Combs, II et al. | |

* cited by examiner

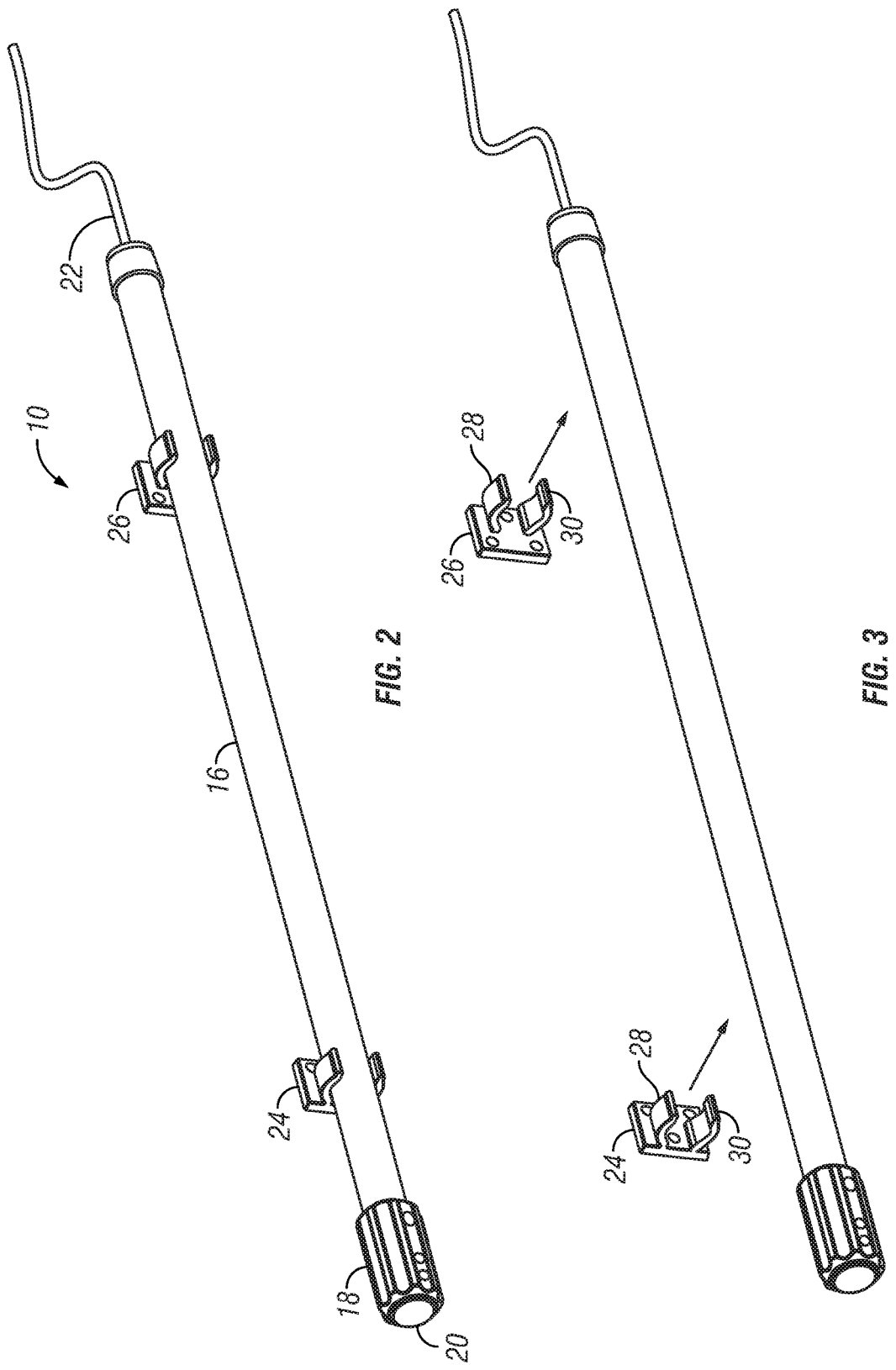

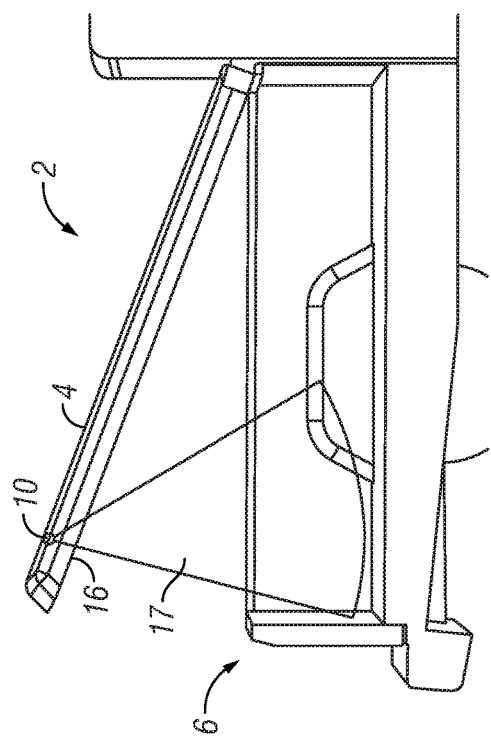
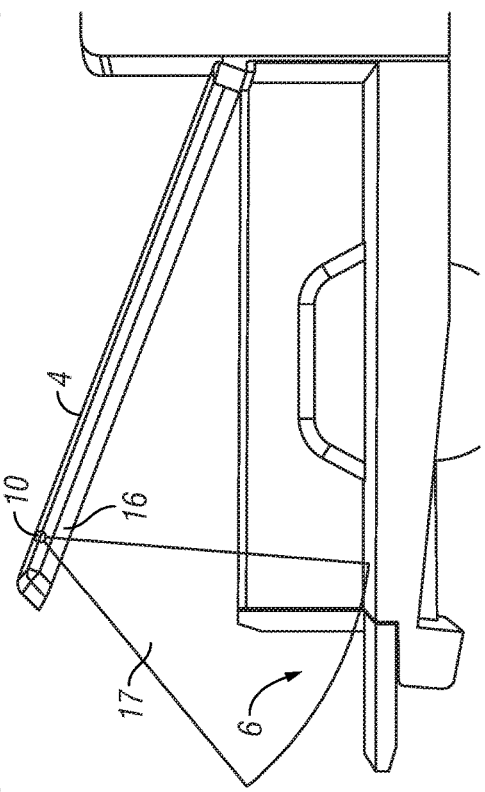
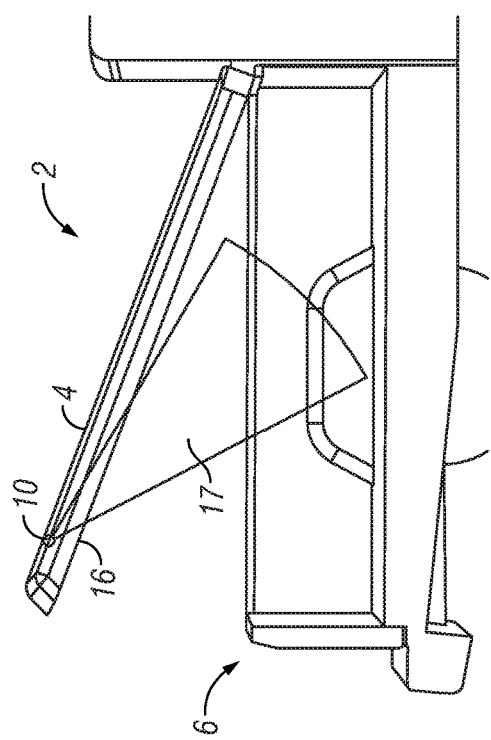

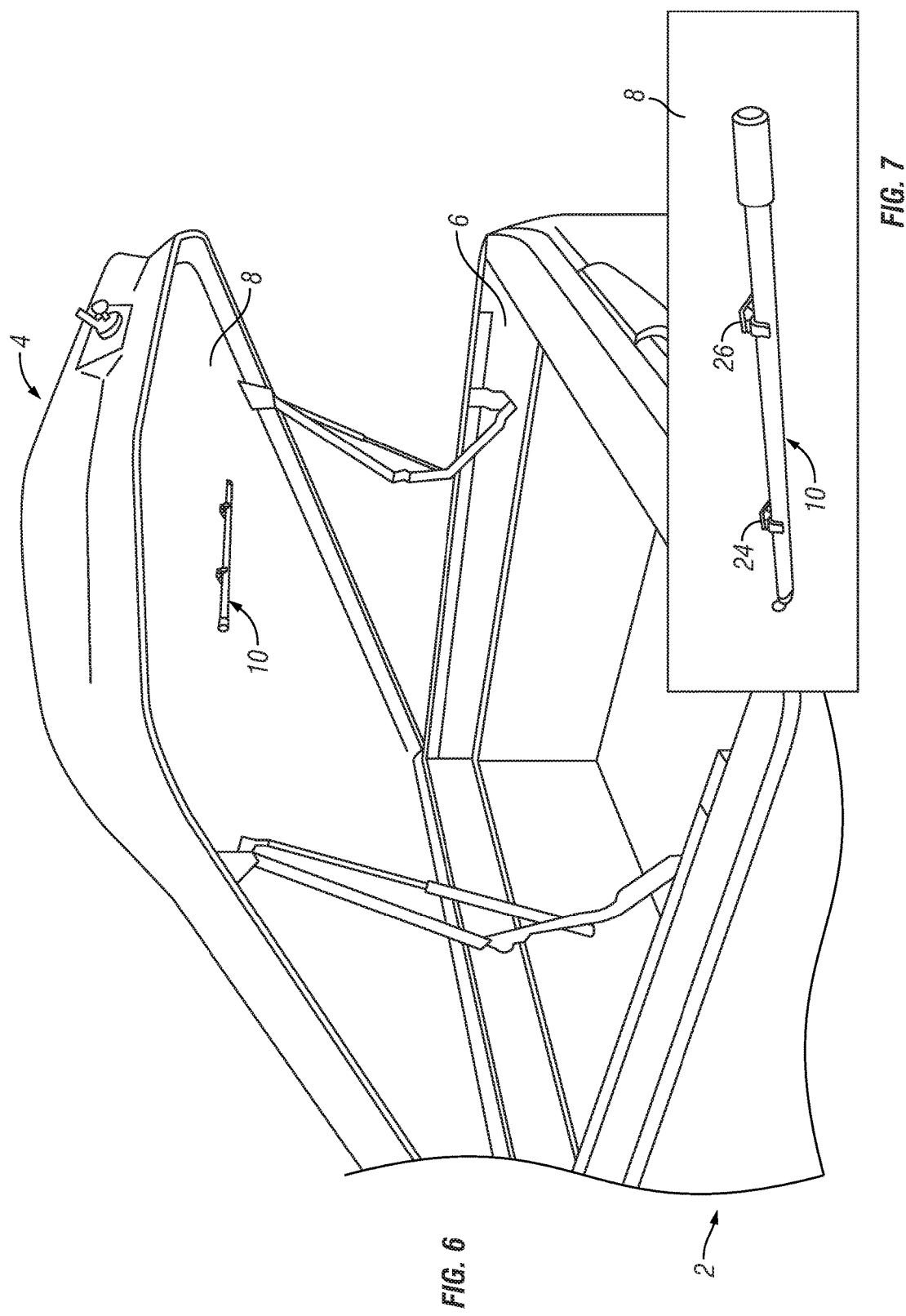

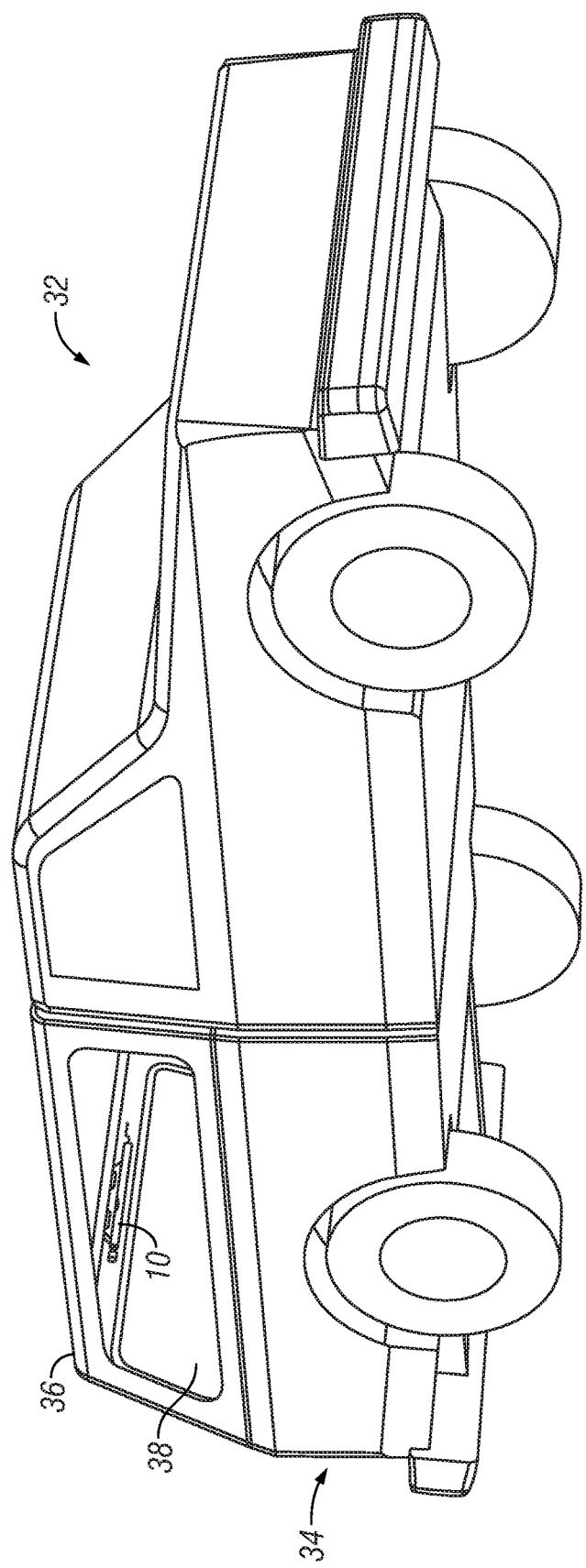

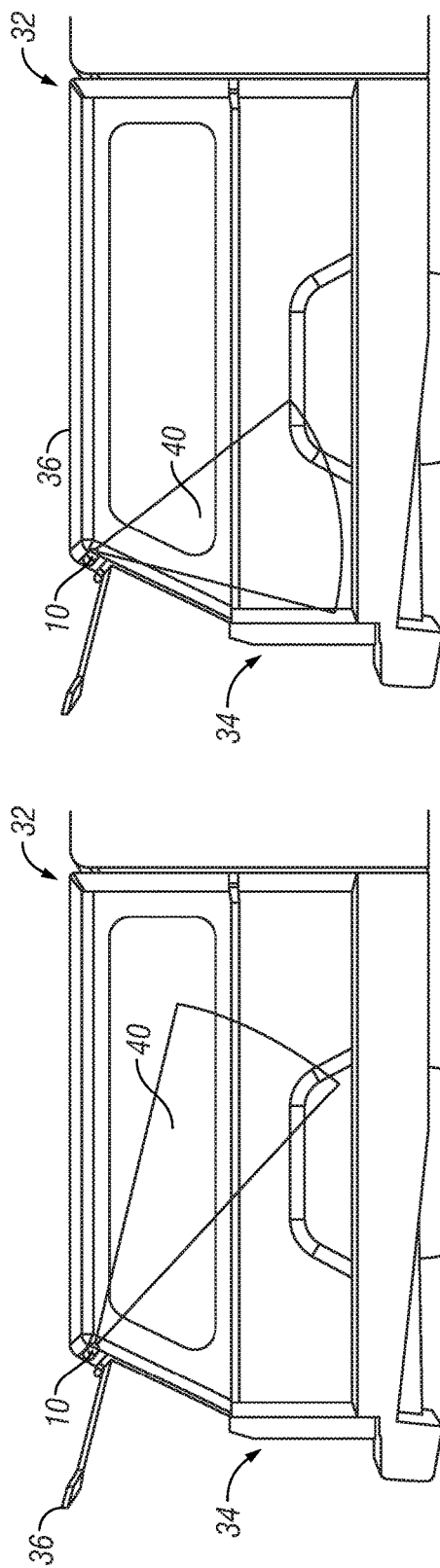
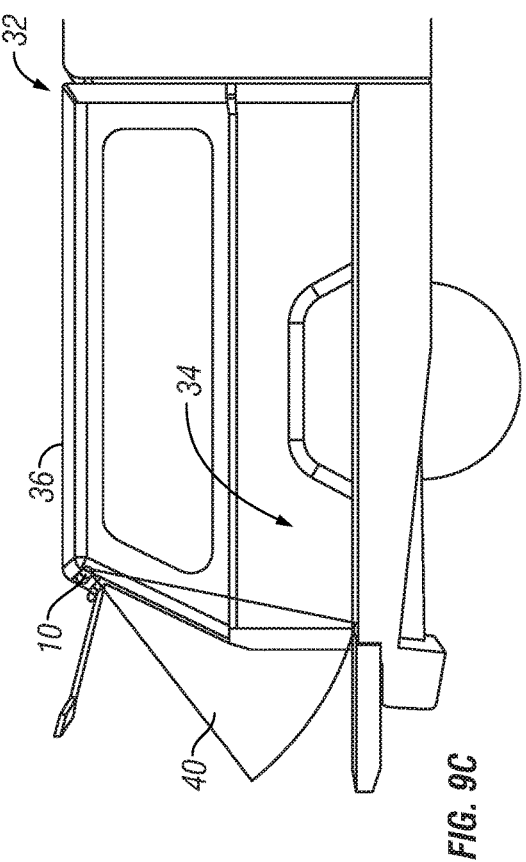
FIG. 9A
FIG. 9B
FIG. 9C

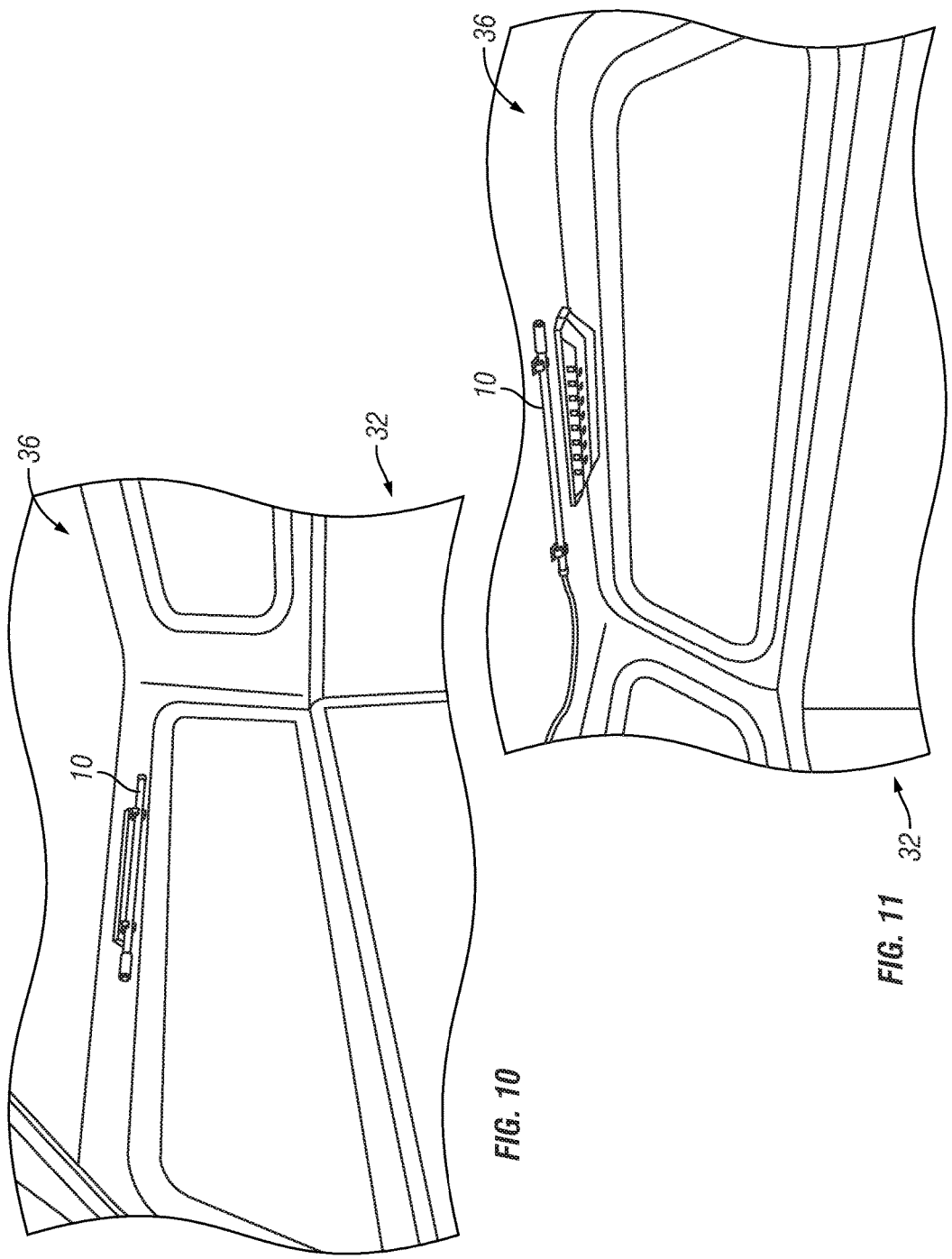

ADJUSTABLE TRUCK COVER LIGHT

RELATED APPLICATIONS

The present application relates to and claims priority to U.S. Provisional Patent Application, Ser. No. 62/270,147, filed on Dec. 21, 2015, entitled "Adjustable Truck Cover Light". The subject matter disclosed in those provisional patent applications are hereby expressly incorporated into the present application.

TECHNICAL FIELD AND SUMMARY

The present disclosure is related to vehicles, such as pickup trucks and the like, and particularly to bed covers and caps for such vehicles. More particularly, the present disclosure is related to lighted covers and caps to illuminate the beds and storage compartments and/or surrounding surfaces of such vehicles.

Truck beds, such as pickup truck beds, are often shrouded by a cover or a cap. The cover, such as a tonneau cover, is configured to lay flat over the bed on its sidewalls. The cover may be lifted, and folded or rolled up to open the cover and gain access to inside the truck bed. A bed cap also covers the truck bed. Instead of generally laying flat on the truck sidewalls, however, the bed cap has sidewalls of its own extending further upward from said truck bed sidewalls. The cap sidewalls terminate at a ceiling to create a rear cabin in conjunction with the truck bed rather than just the flat cover. In either instance, covering the bed means less light on the bed. Even if there are windows in the cap, being able to see inside the bed may still be an issue. It may be useful to provide a light inside the bed on the cover or cap. Furthermore, it may be useful for the light to be removable so that an operator can use it as a portable light for use either interior or exterior of the vehicle. In other embodiments, the light may also be used in storage compartments of the cap or other locations (such as tool boxes).

An illustrative embodiment of the present disclosure provides a cover or cap that has a light selectively attachable to the interior portion of the cover or cap. The light may be located at the tailgate end of the cover or cap to make accessing it from the tailgate side of the truck more convenient. It is appreciated, however, that in other embodiments the light may be selectively attached to other locations on the cover or cap. In an embodiment, the light is a tube light that may be removably attachable to clips which themselves are fastened to an interior surface of either the cover or cap. This allows the light tube to be secured in place where and when needed, yet a low pull force is all that is necessary to extricate the tube light from the clips for use by the operator. In an illustrative embodiment, an on and off switch may be affixed to the tube light. In another embodiment, the on and off switch may be located at the end of the light tube. In another embodiment, the light tube may include a knob that rotates the light tube to adjust the direction of the light. In yet another embodiment, the light may be wired to the truck's electrical system to receive electricity. In a further embodiment, the light may be battery operated. In still another embodiment the light may be powered by rechargeable batteries that, when the light is stowed, the truck's electrical system recharges the batteries.

An illustrative embodiment of the present disclosure provides a pickup truck which comprises a tonneau cover and a light system. The tonneau cover covers a pickup truck bed. Further, the tonneau cover includes: a top side; an underside surface located opposite the top side; and a light system selectively attached to the underside surface of the tonneau cover. The light system includes: a longitudinally extending rod having an illuminating portion extending along at least a portion of the longitudinal extent of the rod; wherein the longitudinally extending rod includes first and second end portions; an on/off switch located at the first end portion of the longitudinally extending rod; a power cord extending from the second end of the longitudinally extending rod; and at least one clip that includes a panel portion that attaches to the underside surface of the tonneau cover and a clip portion having opposing clip arms and a space in between, wherein the longitudinally extending rod of the light system is locatable in the space and selectively held by the opposing clip arms; and wherein the longitudinally extending rod is pivotable within the at least one clip such that the illuminating portion is selectively directable toward different directions.

In the above and other illustrative embodiments, the pickup truck may further comprise: wherein the longitudinally extending rod has a cross-sectional profile selected from the group consisting of square, rectangular, hexagonal, and circular; wherein the on/off switch is selected from the group consisting of a push button and a rotating knob; the first and second ends are axially opposed to each other; the at least one clip is a plurality of clips; the longitudinally extending rod is removable from the at least one clip; a knob providing a grippable surface to manually pivot the longitudinally extending rod; and the illuminating portion being composed of a plurality of light emitting diodes (LEDs).

Another illustrative embodiment of the present disclosure may include a pickup truck that comprises a tonneau cover and light system. The tonneau cover covers a pickup truck bed. The light system is selectively attached to the tonneau cover. The light system includes: a longitudinally extending rod having an illuminating portion extending along at least a portion of the longitudinal extent of the rod; the longitudinally extending rod includes first and second end portions; an on/off switch is located at least adjacent to the first end portion of the longitudinally extending rod; at least one clip attached to the tonneau cover that selectively holds the longitudinally extending rod; and the longitudinally extending rod being pivotable within the at least one clip such that the illuminating portion is selectively directable toward different directions.

In the above and other illustrative embodiments, the pickup truck may further comprise: the tonneau cover including a top side, and an underside surface located opposite the top side; the light system being selectively attached to the underside surface of the tonneau cover; the on/off switch being located at least adjacent to the first end portion of the longitudinally extending rod is located at the first end portion of the longitudinally extending rod; a power cord extending from the second end of the longitudinally extending rod and connected to an electrical system of the pickup truck; the longitudinally extending rod receives at least one battery to power the illuminating portion; the at least one battery being at least one rechargeable battery; the at least one rechargeable battery being a nickel cadmium or lithium ion battery; and the at least one clip including a panel portion that attaches to the tonneau cover and a clip portion having opposing clip arms and a space in between wherein the longitudinally extending rod of the light system being locatable in the space and selectively held by the opposing clip arms.

Another illustrative embodiment of the present disclosure may include a pickup truck that comprises a bed cap cover and light system. The bed cap cover forms a compartment over a pickup truck bed. The bed cap cover includes at least first, second, and third side walls depending from a ceiling located opposite a roof. A light system selectively attached to the bed cap at a location selected from at least one of the at least first, second, and third side walls, and the ceiling. The light system includes a longitudinally extending rod having an illuminating portion extending along at least a portion of the longitudinal extent of the rod, the longitudinally extending rod includes first and second end portions, an on/off switch located at the first end portion of the longitudinally extending rod; at least one clip that includes a panel portion that attaches to the bed cap cover and a clip portion having opposing clip arms and a space in between wherein the longitudinally extending rod of the light system being locatable in the space and selectively held by the opposing clip arms; and wherein the longitudinally extending rod being pivotable within the at least one clip such that the illuminating portion is selectively directable toward different directions.

In the above and other illustrative embodiments, the pickup truck may further comprise: the longitudinally extending rod being located on the ceiling of the bed cap; a power cord extending from the second end of the longitudinally extending rod and connected to an electrical system of the pickup truck to power the illuminating portion; and the longitudinally extending rod receiving at least one battery to power the illuminating portion.

Additional features of the present disclosure will become apparent to those skilled in the art upon consideration of illustrative embodiments of carrying out the disclosure as presently perceived.

BRIEF DESCRIPTION OF THE DRAWINGS

The present disclosure will be described hereafter with reference to the attached drawings which are given as non-limiting examples only, in which:

FIG. 2 is a perspective view of an illustrative embodiment of a tube light and clips;

FIG. 3 is another perspective view of the tube light with it removed from the clips;

FIGS. 5A, 5B, and 5C are side views of the bed portion of the pickup truck with the tonneau cover elevated and the light attached to the inner surface of the cover and moveable in a variety of directions;

FIG. 6 is another perspective view of the light attached to the interior surface of the tonneau cover attached to the bed of the pickup truck;

FIG. 7 is a detail view of the light attached to the interior surface of the tonneau cover;

FIG. 8 is a front perspective view of a pickup truck, but with a cap attached to the bed portion and the adjustable light attached to the interior surface of the cap;

FIGS. 9A, 9B, and 9C are all side views of the bed portion of the pickup truck with the cap and light installed, and showing the adjustability of the light focus attainable by the light;

FIG. 10 is a perspective view of the interior of the truck bed and cap with the adjustable light attached to the cap at the tailgate end of the truck; and FIG. 11 is another perspective view inside the cap looking towards the forward end of the cap with another light attached to the interior surface of that cap.

Corresponding reference characters indicate corresponding parts throughout the several views. The exemplification set out herein illustrates an embodiment of the disclosure, and such exemplification is not to be construed as limiting the scope of the disclosure in any manner.

DETAILED DESCRIPTION OF THE DRAWINGS

The figures and descriptions provided herein may have been simplified to illustrate aspects that are relevant for a clear understanding of the herein described structures, while eliminating, for the purpose of clarity, other aspects that may be found in typical structures. Those of ordinary skill may recognize that other elements and/or operations may be desirable and/or necessary to implement the structures described herein. Because such elements and operations would be known in the art, and because they do not facilitate a better understanding of the present disclosure, a discussion of such elements and operations may not be provided herein. The present disclosure, however, is deemed to inherently include all such elements, variations, and modifications to the described aspects that would be known to those of ordinary skill in the art.

Figure 1:
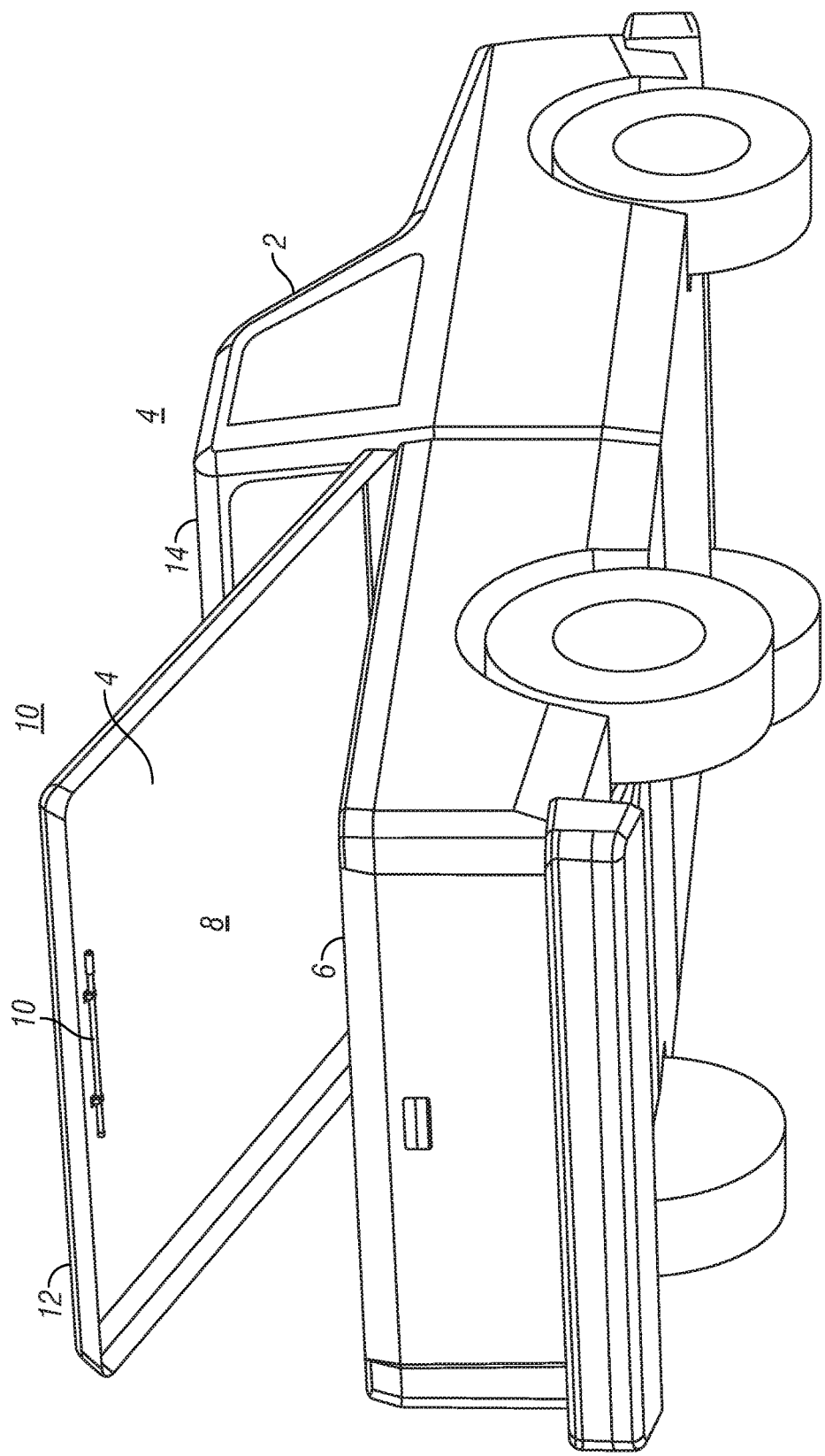
FIG. 1 is a rear perspective view of a pickup truck with a tonneau cover attached over the truck's bed and a light attached to the tonneau cover.

A rear perspective view of a pickup truck 2 with a tonneau cover 4 configured to selectively cover truck bed 6 is shown in FIG. 1. Tonneau cover 4 includes an inner surface 8 that receives an adjustable light 10. As shown in this view, light 10 may provide a source of illumination for inside truck bed 6. In the illustrated embodiment, light 10 is located at the distal end 12 from cab 14 on truck 2, making it easier for an operator to reach in and adjust the light by hand. In addition, the light is configured to be selectively removable so the operator may detach light 10 from its location on tonneau cover 4 in order to illuminate other desired areas.

A perspective view of an illustrative embodiment of adjustable light 10 is shown in FIG. 2. Adjustable light 10 includes illustrative light tube 16 having a rotating knob 18, an on/off switch 20 located at one end, and illustratively a power cord 22 attached at the other end. It is appreciated that with respect to the light tube, it may be of any variety of configurations including round, square, triangular, hexagonal, and the like. With regard to knob 18 and switch 20, those can be modified or located in a different position per other embodiments. Likewise, power cord 22 can attach to light 16 and include the electronics necessary to power either the bulbs if an incandescent, fluorescent, halogen, or other type illuminating source; or, alternatively, can power LED lights. Additionally, in other embodiments the power source may be battery operated. The light may include a recharging circuit to accommodate rechargeable NiCD, Li Ion or other battery types.

In this embodiment, light 16 is held in place by clips 24 and 26, as shown in both FIGS. 2 and 3. Each clip 24 and 26 has spaced apart fingers 28 and 30 configured to hold light 16. In the illustrated embodiment, fingers 28 and 30 conform generally to the outer periphery shape of light 16 so as to selectively hold it in place. This allows the light to be held and illuminate below the tonneau cover or cap into the bed. Alternatively, the light may be removed and used as a remote light source. The power cord may be permanently affixed to the light or may be attached via a connector cord for easy removability in the case of battery powered configurations.

Figure 4:
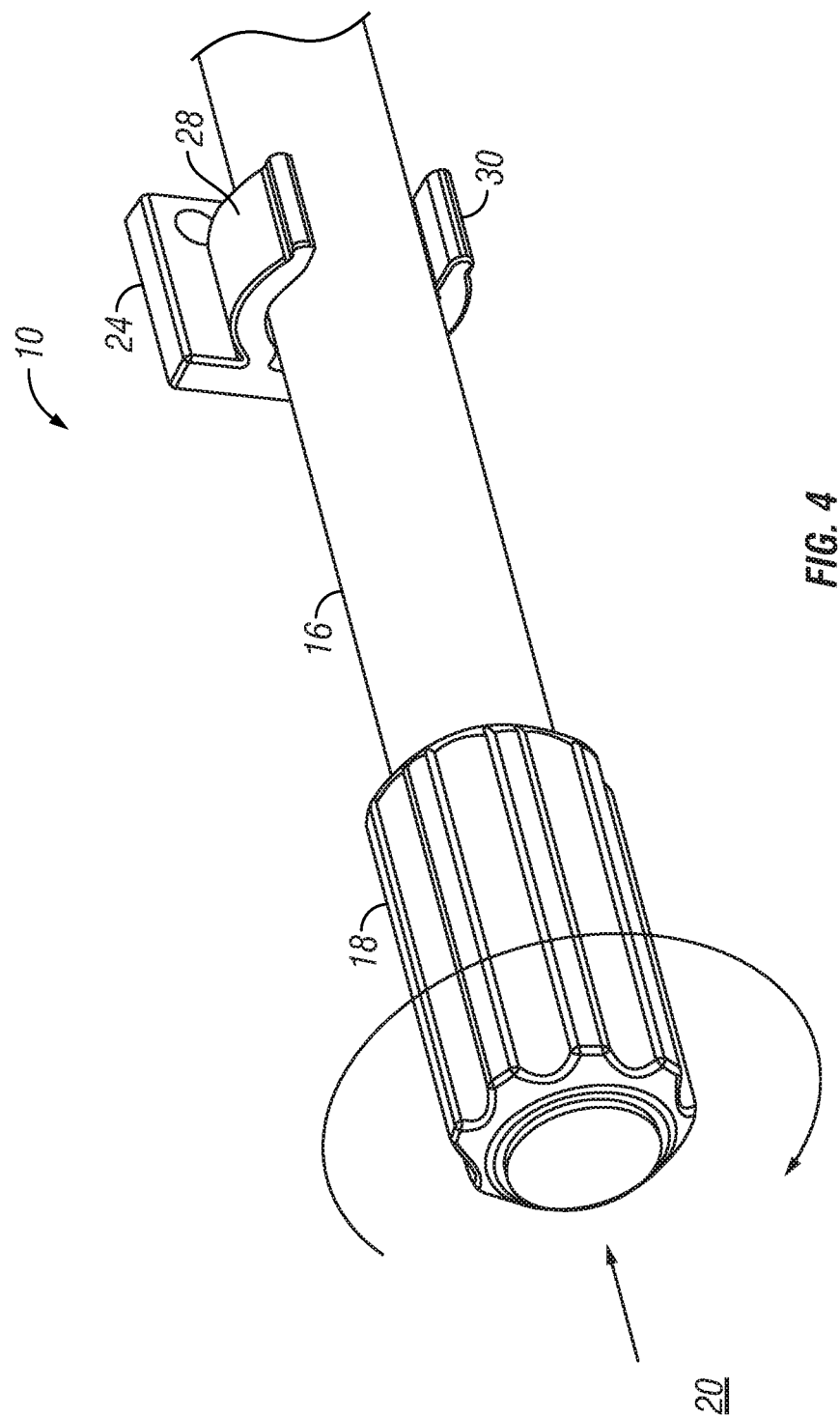
FIG. 4 is a detail perspective view of a portion of the light tube showing an on and off switch, as well as a rotating knob.

A detail perspective view of light 10 is shown in FIG. 4. This view shows light tube 16 held on by clip 24 using fingers 28 and 30, as illustratively shown. Knob 18 illustratively acts as a handle or grip surface, allowing an operator to hold and turn or even remove light 10 without touching light tube 16. Also in this illustrative embodiment is an off button 20 adjacent handle 18 to conveniently turn the light tube 16 on and off.

Side views of bed 6 of pickup truck 2 with tonneau cover 4 attached thereto is shown in FIGS. 5A, 5B, and 5C. These figures demonstrate how pivoting light tube 16 under cover 4 affects the direction of light beam 17. The light beam 17 is directional to cover most desired areas in truck bed 6.

Another perspective view of truck 2 is shown in FIG. 6 with cover 4 located in its upright position above bed 6 with light 10 installed therein. A detailed view of light 10 attached to the inside surface 8 of cover 4 is shown in FIG. 7. This view demonstrates how the light can be clipped into place and held by clips 24 and 26.

A front perspective view of a pickup truck 32 having a rear bed 34 with a cap 36 on top is shown in FIG. 8. As can be seen through window opening 38, an adjustable light 10 is attached to cap 36 to provide a light source for inside bed 34. It is appreciated that adjustable light 10 in cap 36 operates and has the same illustrative features as that discussed with respect to pickup truck 2 and is shown in FIGS. 3 and 4.

Side views of bed portion 34 of pickup truck 32 with a cap 36 over bed 34 are shown in FIGS. 9A, 9B, and 9C. These views, similar to that shown in FIG. 5 depict how light 10 can be pivoted to direct its beam 40 to different directions with cap 36. The interior views shown in FIGS. 10 and 11 demonstrate how light 10 can be attached to cap 36 to direct light therein. As with the previous embodiment, the embodiment shown herein may be removed to provide a remote light source.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure.

What is claimed is:

1. A pickup truck comprising:
a tonneau cover that covers a pickup truck bed;
wherein the tonneau cover includes:
a top side;
an underside surface located opposite the top side;
a light system selectively attached to the underside surface of the tonneau cover;
wherein the light system includes:
a longitudinally extending rod having an illuminating portion extending along at least a portion of the longitudinal extent of the rod;
wherein the longitudinally extending rod includes first and second end portions;
an on/off switch located at the first end portion of the longitudinally extending rod;
a power cord extending from the second end of the longitudinally extending rod; and
at least one clip that includes a panel portion that attaches to the underside surface of the tonneau cover and a clip portion having opposing clip arms and a space in between wherein the longitudinally extending rod of the light system is locatable in the space and selectively held by the opposing clip arms;
wherein the longitudinally extending rod is pivotable within the at least one clip such that the illuminating portion is selectively directable toward different directions.

2. The pickup truck of claim 1, wherein the longitudinally extending rod has a cross-sectional profile selected from the group consisting of square, rectangular, hexagonal, and circular.

3. The pickup truck of claim 1, wherein the on/off switch is selected from the group consisting of a push button and a rotating knob.

4. The pickup truck of claim 1, wherein the first and second ends are axially opposed to each other.

5. The pickup truck of claim 1, wherein the at least one clip is a plurality of clips.

6. The pickup truck of claim 1, wherein the longitudinally extending rod is removable from the at least one clip.

7. The pickup truck of claim 1, further comprising a knob providing a grippable surface to manually pivot the longitudinally extending rod.

8. The pickup truck of claim 1, wherein the illuminating portion is composed of a plurality of light emitting diodes (LEDs).

9. A pickup truck comprising:
a tonneau cover that covers a pickup truck bed;
a light system selectively attached to the tonneau cover;
wherein the light system includes:
a longitudinally extending rod having an illuminating portion extending along at least a portion of the longitudinal extent of the rod;
wherein the longitudinally extending rod includes first and second end portions;
an on/off switch located at least adjacent to the first end portion of the longitudinally extending rod;
at least one clip attached to the tonneau cover that selectively holds the longitudinally extending rod;
wherein the longitudinally extending rod is pivotable within the at least one clip such that the illuminating portion is selectively directable toward different directions.

10. The pickup truck of claim 9, wherein the tonneau cover includes: a top side; and an underside surface located opposite the top side; and wherein the light system is selectively attached to the underside surface of the tonneau cover.

11. The pickup truck of claim 9, wherein the on/off switch located at least adjacent to the first end portion of the longitudinally extending rod is located at the first end portion of the longitudinally extending rod.

12. The pickup truck of claim 9, further comprising a power cord extending from the second end of the longitudinally extending rod and connected to an electrical system of the pickup truck.

13. The pickup truck of claim 9, wherein the longitudinally extending rod receives at least one battery to power the illuminating portion.

14. The pickup truck of claim 13, wherein the at least one battery is at least one rechargeable battery.

15. The pickup truck of claim 14, wherein the at least one rechargeable battery is a nickel cadmium or lithium ion battery.

16. The pickup truck of claim 9, wherein the at least one clip includes a panel portion that attaches to the tonneau cover and a clip portion having opposing clip arms and a space in between wherein the longitudinally extending rod of the light system is locatable in the space and selectively held by the opposing clip arms.

17. A pickup truck comprising:
    a bed cap that covers and forms a compartment over a pickup truck bed;
    wherein the bed cap cover includes:
        at least first, second, and third side walls depending from a ceiling located opposite a roof;
        a light system selectively attached to the bed cap at a location selected from at least one of the at least first, second, and third side walls, and the ceiling;
        wherein the light system includes:
            a longitudinally extending rod having an illuminating portion extending along at least a portion of the longitudinal extent of the rod;
            wherein the longitudinally extending rod includes first and second end portions;
            an on/off switch located at the first end portion of the longitudinally extending rod;
            at least one clip that includes a panel portion that attaches to the bed cap cover and a clip portion having opposing clip arms and a space in between wherein the longitudinally extending rod of the light system is locatable in the space and selectively held by the opposing clip arms;
        wherein the longitudinally extending rod is pivotable within the at least one clip such that the illuminating portion is selectively directable toward different directions.

18. The pickup truck of claim 17, wherein the longitudinally extending rod is located on the ceiling of the bed cap.

19. The pickup truck of claim 17, further comprising a power cord extending from the second end of the longitudinally extending rod and connected to an electrical system of the pickup truck to power the illuminating portion.

20. The pickup truck of claim 17, wherein the longitudinally extending rod receives at least one battery to power the illuminating portion.

* * * * *